US006065825A

United States Patent [19]

Anagnostopoulos et al.

[11] Patent Number: 6,065,825

[45] Date of Patent: May 23, 2000

[54] PRINTER HAVING MECHANICALLY-ASSISTED INK DROPLET SEPARATION AND METHOD OF USING SAME

[75] Inventors: Constantine N. Anagnostopoulos, Mendon; James M. Chwalek, Pittsford; John A. Lebens, Rush; Christopher N. Delametter, Rochester; Walter S. Stevens, Fairport, all of N.Y.

[73] Assignee: Eastman Kodak Company, Rochester, N.Y.

[21] Appl. No.: 08/969,299

[22] Filed: Nov. 13, 1997

[51] Int. Cl.[7] .................................................... G01D 15/18

[52] U.S. Cl. ................................................ 347/44; 347/21

[58] Field of Search .................................. 347/21, 44, 54

[56] References Cited

U.S. PATENT DOCUMENTS

| | | | |
|---|---|---|---|
| 3,946,398 | 3/1976 | Kyser et al. | 347/70 |
| 4,242,688 | 12/1980 | Doring | 347/44 |
| 4,575,738 | 3/1986 | Sheufelt et al. | 347/21 X |
| 4,598,303 | 7/1986 | Peekema et al. | 347/21 X |
| 4,613,875 | 9/1986 | Le et al. | 347/21 |
| 4,728,969 | 3/1988 | Le et al. | 347/21 |
| 4,801,954 | 1/1989 | Miura et al. | 347/21 |
| 4,893,646 | 1/1990 | Wimmer | 137/487.5 |
| 4,942,409 | 7/1990 | Paton et al. | 347/21 |
| 5,278,583 | 1/1994 | Oda et al. | 347/55 |
| 5,726,693 | 3/1998 | Sharma et al. | 347/54 X |
| 5,795,970 | 8/1998 | Ono et al. | 347/100 X |
| 5,877,788 | 3/1999 | Haan et al. | 347/21 X |

OTHER PUBLICATIONS

Silverbrook, "A Liquid Ink Printing Apparatus and System", USSN 08/750,438 (Attorney Docket No. 73381), filed Dec. 3, 1996.

Hershberg et al., "Manufacturing Technology Of The Tektronix Digital Ink Jet Head", Aug. 24–28, 1986, The Third International Congress on Advances in Non–Impact Printing Technologies, pp. 322–333.

*Primary Examiner*—Fred L. Braun
*Attorney, Agent, or Firm*—Walter S. Stevens

[57] ABSTRACT

A printer having mechanically-assisted ink droplet separation and method of using same, for separating an ink meniscus from an ink nozzle orifice while clearing-away particulate matter from about the orifice. In a preferred embodiment of the invention, a heater surrounds an orifice formed by the nozzle, the orifice having an ink meniscus residing therein. As the heater heats the ink meniscus, surface tension of the ink meniscus decreases, thereby causing the ink meniscus to extend outwardly from the orifice to define an extended ink meniscus. A cutter, which is disposed near the orifice, includes a plate member disposed opposite an outside surface of the nozzle so as to define a passage between the outside surface and the plate member. The plate member has an opening aligned with the orifice and in communication with the passage. A gas pressure regulator in communication with the passage supplies pressurized gas into the passage, which gas flows along the passage an through the opening. As the gas flows through the opening, it impinges the extended ink meniscus to separate the extended ink meniscus from the orifice. As the extended ink meniscus separates from the orifice, it forms an ink droplet that travels to a receiver medium, so that an ink spot is placed onto the receiver medium. Moreover, as the gas flows through the opening, the gas clears-away particulate matter from about the orifice.

35 Claims, 7 Drawing Sheets

PRINTER HAVING MECHANICALLY-ASSISTED INK DROPLET SEPARATION AND METHOD OF USING SAME

FIELD OF THE INVENTION

This invention generally relates to printer apparatus and methods and more particularly relates to a printer having mechanically-assisted ink droplet separation and method of using same, for separating an ink meniscus from an ink nozzle orifice while clearing-away particulate matter from about the orifice.

BACKGROUND OF THE INVENTION

In the typical inkjet printer, ink is disposed in a plurality of ink chambers formed in respective ones of a plurality of nozzles belonging to a print head. An orifice in communication with the chamber opens onto a receiver medium which receives ink droplets ejected from the orifice. The means of ejection may, for example, be a piezoelectric crystal disposed in the nozzle and deformable when subjected to an electric pulse. When the crystal deforms, a pressure wave is produced in the ink in the nozzle, which pressure wave ejects one or more ink droplets. Other types of inkjet printers include heaters situated below the orifice for creating a steam bubble which, when activated, propels ink through the orifice and onto the surface of the receiver media. Inkjet printing has become recognized as a prominent contender in the digitally controlled, electronic printing arena because, for example, of its non-impact, low-noise characteristics, its use of plain paper and its avoidance of toner transfers and fixing.

However, a problem associated with some prior art inkjet printers is blockage and clogging of the nozzle orifice with particulate matter (e.g., dirt, dust, and the like) acquired during use. Such blockage of the orifices is undesirable because blockage of one or more of the orifices gives rise to undesirable image artifacts, such as banding and streaking.

Another problem associated with some prior art inkjet printers is blockage and clogging of the orifice with dried ink. Again, such blockage of the orifices is undesirable because blockage of one or more of the orifices gives rise to undesirable image artifacts, such as banding and streaking.

A type of ink jet printing mechanism is disclosed in U.S. Pat. No. 3,946,398, which issued to Kyser et al. in 1970. This patent discloses a drop-on-demand ink jet printer which applies a high voltage to a piezoelectric crystal, causing the crystal to bend, thereby applying pressure on an ink reservoir and jetting ink drops on demand. However, such piezoelectric printing mechanisms usually require complex high voltage drive circuitry and bulky piezoelectric crystal arrays, which are disadvantageous with respect to manufacturability and performance. Moreover, the Keyser et al. patent does not appear to disclose a printer having mechanically-assisted ink droplet separation and method of using same, for separating an ink meniscus from an ink nozzle orifice while clearing-away particulate matter from about the orifice.

Commonly assigned U.S. patent application Ser. No. 08/750,438 titled "A Liquid Ink Printing Apparatus And System" filed in the name of Kia Silverbrook on Dec. 3, 1996, discloses a drop-on-demand liquid printing system that obtains precise drop size and placement accuracy, high printing speeds, low power usage, durability, low thermal stresses, and other desirable printer performance characteristics, such as ease of manufacture, and use of inks having suitable characteristics. Silverbrook provides a drop-on-demand printing mechanism wherein a means of selecting drops to be printed produces a difference in position between selected drops and drops which are not selected. The application of an electric field or the adjustment of receiver proximity are disclosed as means for causing separation of the selected drops from the body of the ink. However, the electric field strength needed to separate the selected drop is in the neighborhood of the value where breakdown of the drop in air occurs. Therefore, use of an electric field is not preferred. Separation by bringing a roller adjacent to the print head to pick-up selected droplets is unreliable due to presence of relatively large dust particles typically found in an uncontrolled environment. Moreover, the Silverbrook patent does not appear to disclose a printer having mechanically-assisted ink droplet separation, for separating an ink meniscus from an ink nozzle orifice while clearing-away particulate matter from about the orifice.

Therefore, there has been a long felt need to provide a printer having mechanically-assisted ink droplet separation and method of using same, for separating an ink meniscus from an ink nozzle orifice while clearing-away particulate matter from about the orifice.

SUMMARY OF THE INVENTION

The invention resides in a printer comprising a print head and a nozzle connected to the print head, the nozzle having a liquid meniscus extending therefrom. A mechanically-assisted cutter is associated with the nozzle for separating the meniscus from the nozzle.

More specifically, in a preferred embodiment of the invention, a heater element surrounds an orifice formed by the nozzle, the orifice having an ink meniscus residing therein. The purpose of the heater element is to heat the ink meniscus. As the heater heats the ink meniscus, surface tension of the ink meniscus decreases. A static back-pressure is applied to the ink meniscus. Therefore, the ink meniscus extends outwardly from the orifice because the ink meniscus is pressurized as the surface tension decreases. A cutter, which is disposed near the orifice, includes a plate member disposed opposite an outside surface of the nozzle so as to define a passage between the outside surface and the plate member. The plate member has an opening aligned with the orifice and in communication with the passage. A gas pressure regulator in communication with the passage supplies pressurized gas into the passage, which gas flows along the passage and through the opening. As the gas flows through the opening, it impinges the extended ink meniscus to separate the extended ink meniscus from the orifice. As the extended ink meniscus separates from the orifice, it forms an ink droplet that travels to a receiver medium in order to place an ink spot onto the receiver medium. Moreover, as the gas flows through the opening, the gas clears-away or prevents any particulate matter from falling onto the nozzle area.

An object of the present invention is to provide a printer having mechanically-assisted ink droplet separation and method of using same, for separating an ink meniscus from an ink nozzle orifice while clearing-away particulate matter from about the orifice.

A feature of the present invention is the provision of plate member disposed opposite an outside surface of a nozzle so as to define a passage therebetween, the nozzle having an orifice and the plate member having an opening therethrough aligned with the orifice and in communication with the passage for directing a gas jet against an ink meniscus extending from the orifice in order to separate the extended ink meniscus from the orifice while clearing-away particulate matter from about the orifice.

An advantage of the present invention is that use thereof separates an ink meniscus from an ink nozzle orifice while clearing-away particulate matter from about the orifice, so that the orifice is blockage-free.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following description when taken in conjunction with the accompanying drawings wherein:

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
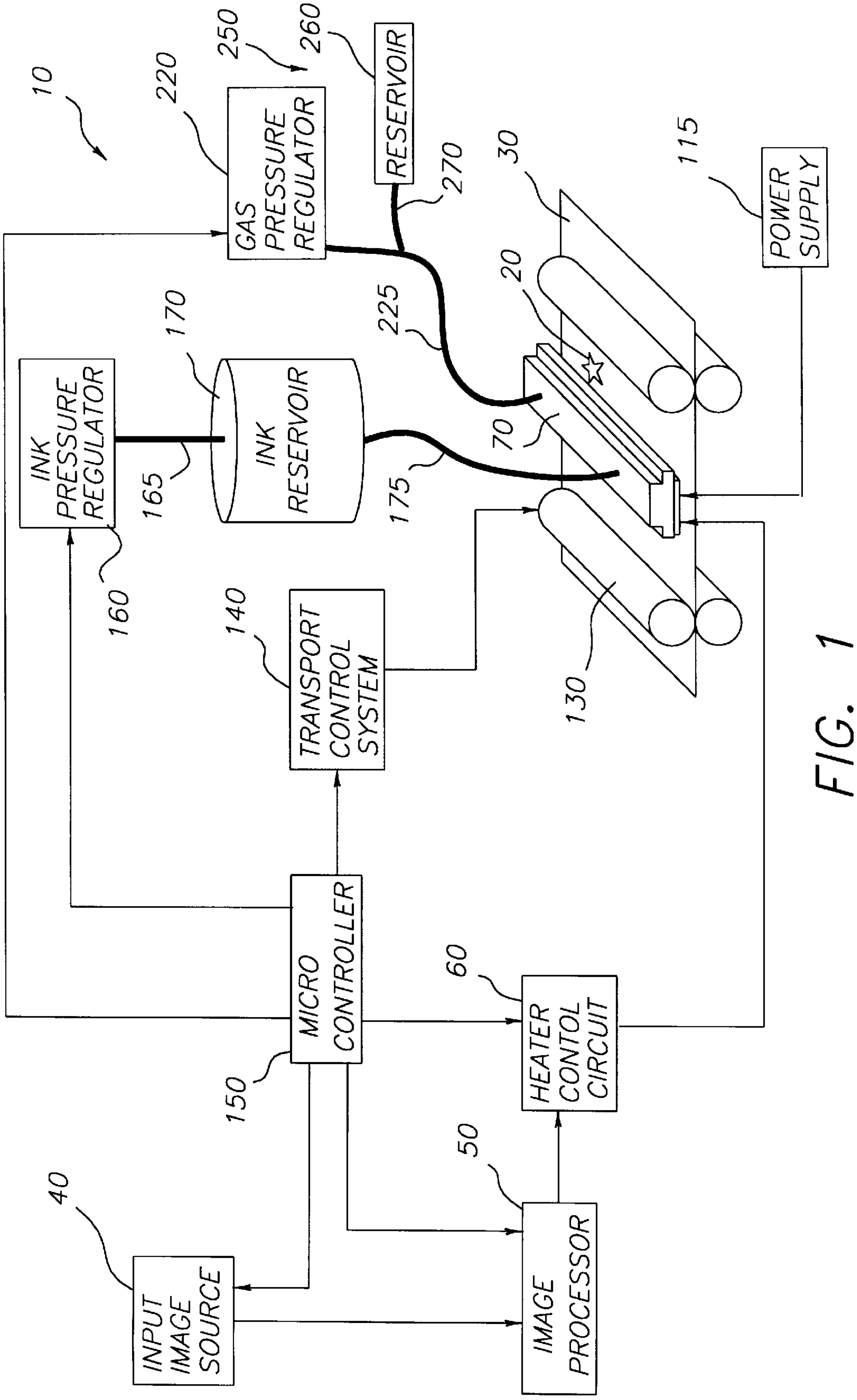
FIG. 1 is a functional schematic diagram of a printer belonging to the invention, which printer includes a print head.
Figure 2:
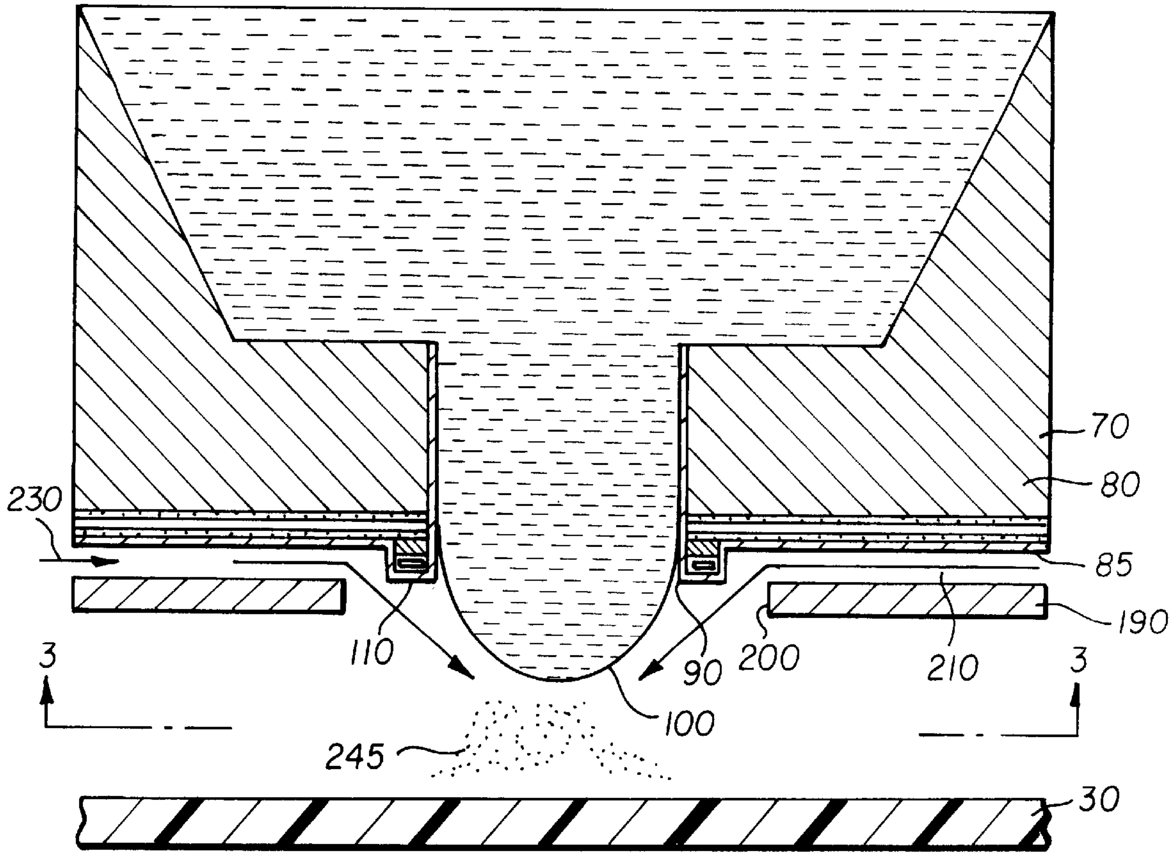
FIG. 2 is a view in vertical section of a nozzle connected to the print head, the nozzle having an ink meniscus disposed therein.
Figure 3:
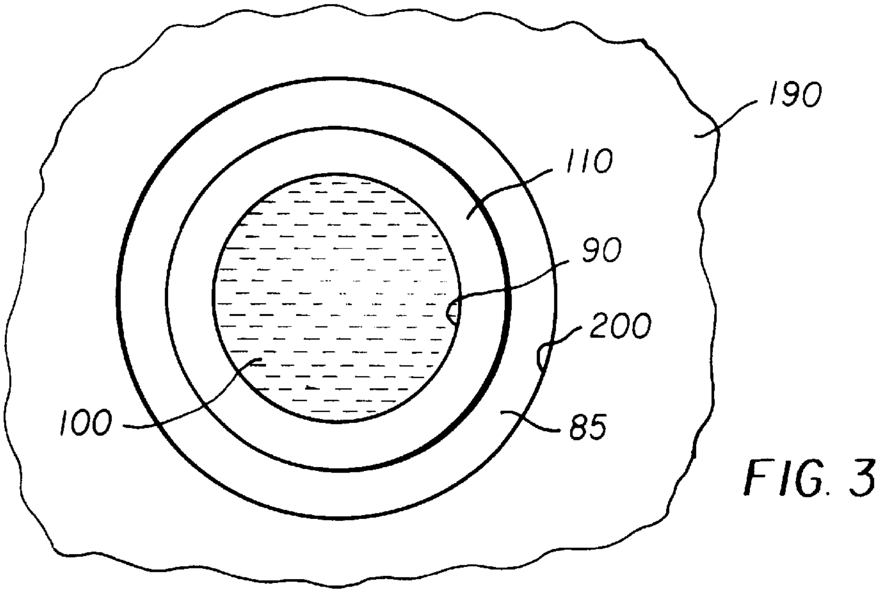
FIG. 3 is a plan view of the nozzle taken along section line 3—3 of FIG. 2.

Therefore, referring to FIGS. 1, 2 and 3, there is shown the subject matter of the present invention, which is a printer, generally referred to as 10, having mechanically-assisted ink droplet separation for printing an image 20 on a receiver medium 30, which may be paper or transparency. As described in detail hereinbelow, the invention separates an ink meniscus from an ink nozzle orifice while clearing-away particulate matter from about the orifice. Printer 10, which is preferably an inkjet drop-on-demand printer, comprises an input image source 40, which may be raster image data from a scanner (not shown) or computer (not shown), or outline image data in the form of a PDL (Page Description Language) or other form of digital image representation. An image processor 50 connected to image source 40 converts the image data to a pixel-mapped page image. A heater control circuit 60 interconnects image processor 50 and a print head 70 having a plurality of nozzles 80 (only one of which is shown) integrally connected to print head 70. Each nozzle 80 has an outside surface 85 and a generally circular orifice 90 formed in outside surface 85 and oriented to face receiver medium 30. An ink meniscus 100 of predetermined surface tension is disposed in orifice 90. In the preferred embodiment of the invention, the predetermined surface tension may be, for example, approximately 20 to 70 dynes/cm.

Referring to FIGS. 1, 2, 3, and 5, a plurality of generally annular heater elements 110 (only one of which is shown) surround respective ones of orifices 90 in order to heat ink meniscus 100. A power supply 115 is electrically connected to heater elements 110 for powering heater elements 110. As heater element 110 heats ink meniscus 100, the previously mentioned predetermined surface tension of ink meniscus 100 relaxes or lowers. In the preferred embodiment of the invention, the predetermined surface tension is lowered, for example, by approximately 10% or more. As the surface tension of ink meniscus 100 relaxes, ink meniscus 100 extends outwardly from orifice 90 to define an extended ink meniscus 120. Ink meniscus 100 extends outwardly from orifice 90 (to define extended ink meniscus 120) due to the combined effects of lowered surface tension and static back pressure acting on ink meniscus, as described more fully hereinbelow.

Returning to FIGS. 1, 2 and 3, heater control circuit 60 reads the image data from image processor 50 and applies time-varying electrical pulses to heater elements 110. These electrical pulses are applied at predetermined times and to a preselected heater elements 110, in order to deposit a plurality of ink spots on receiver medium 30 in predetermined positions for forming image 20. Also, in order to deposit the ink drops on receiver medium 30 at the appropriate positions, receiver medium 30 is moved relative to print head 70 by a transport system 130. Transport system 130 is electronically controlled by a transport control system 140 electrically coupled to transport system 130. Moreover, transport control system 140 is electrically connected to a microcontroller 150 which controls transport control system 140. Microcontroller 150 is preferably also electrically connected to heater control circuit 60 for controlling heating control circuit 60. In addition, microcontroller 150 is preferably electrically connected to an ink pressure regulator for controlling supply of pressurized ink to nozzles 80, so that a predetermined static back pressure is applied to ink meniscus 100. In this regard, in the preferred embodiment of the invention, this static back pressure may be, for example, approximately 1–3 $lbf/in^2$ or more. In addition, connected to pressure regulator 160, such as by a first conduit 165, is an ink reservoir 170 containing the ink under pressure. Thus, the previously mentioned static back pressure is achieved by applying pressure to ink reservoir 170 under control of ink pressure regulator 160. Ink reservoir 170 distributes ink to print head 70, such as by means of a second conduit 175, so that the ink flows into each nozzle 80 and forms ink menisci 100. It may be understood from the teachings herein, that the static back pressure is initially insufficient to overcome the surface tension of each ink meniscus 100 and eject an ink drop. It is only when heater element 110 heats ink meniscus 100 does ink meniscus extend outwardly from orifice 90 to define extended ink meniscus 120 due to the combined effect of static back pressure and relaxation of surface tension. Of course, it is desirable to separate extended ink meniscus 100 from orifice 90 in order to form an ink droplet 180 (see FIG. 6) to be deposited onto receiver 30.

Referring to FIGS. 1, 4, 5 and 6, a plurality of mechanically-assisted cutters, associated with respective ones of nozzles 80, are also provided for separating extended ink meniscus 100 from orifice 90. In a first embodiment of the invention, each cutter comprises a plate member 190 having a generally circular opening 200 surrounding orifice 90 and centrally aligned therewith. Plate member 200 is disposed opposite outside surface 85 so as to define a passage 210 therebetween in communication with orifice 90. In this regard, passage 210 surrounds orifice 90. Each passage 210 is also in communication, such as by means of a third conduit 225, with a gas pressure regulator 220. Gas pressure regulator 220 controllably supplies a gas, such as air, to each passage 210, as described in detail presently. In this regard, previously mentioned microcontroller 150 is electrically connected to gas pressure regulator 220 for controlling gas pressure regulator 220 in order that gas pressure regulator 220 controllably supplies the gas into each passage 210, generally in a direction illustrated by an arrow 230.

Figure 4:
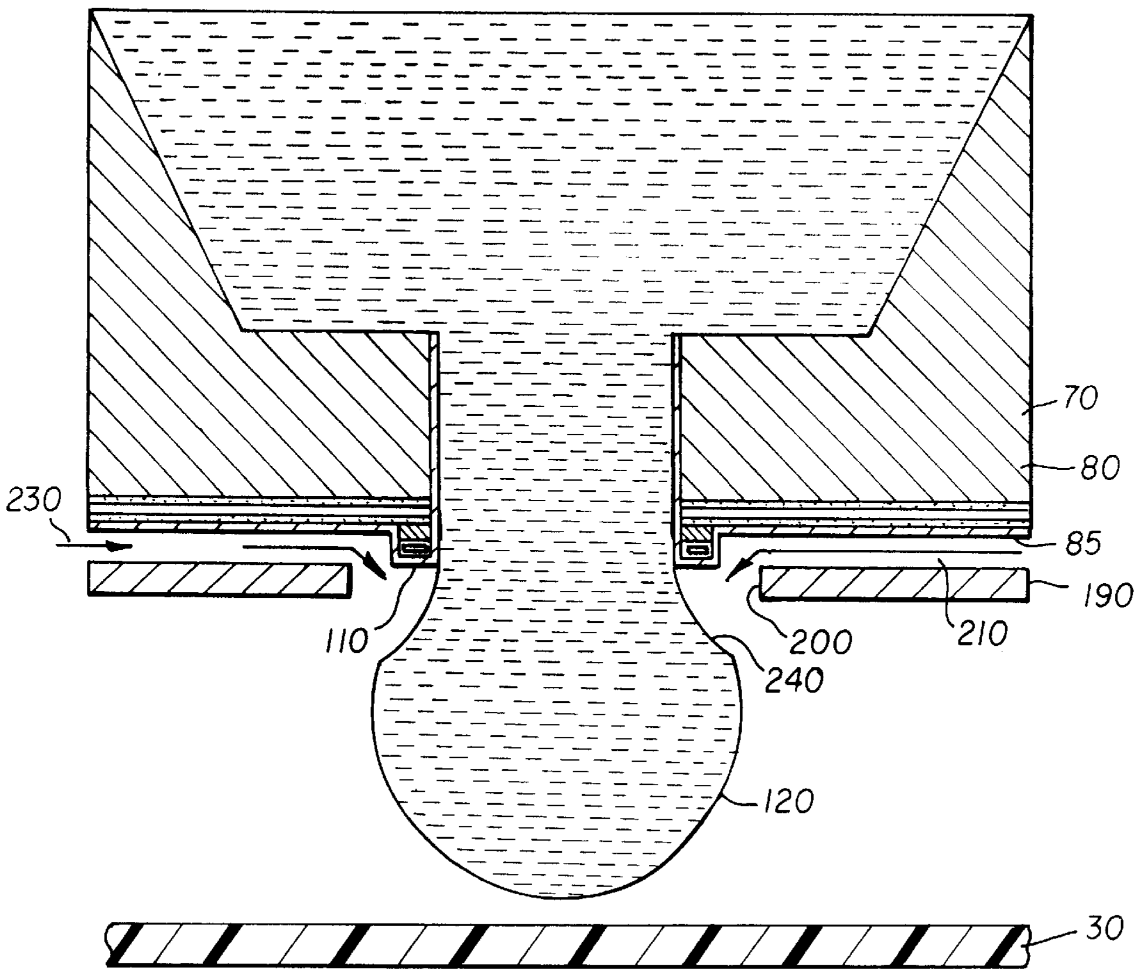
FIG. 4 is a view in vertical section of the nozzle connected to the print head, this view showing the ink meniscus being formed into an extended ink meniscus extending from the nozzle.
Figure 5:
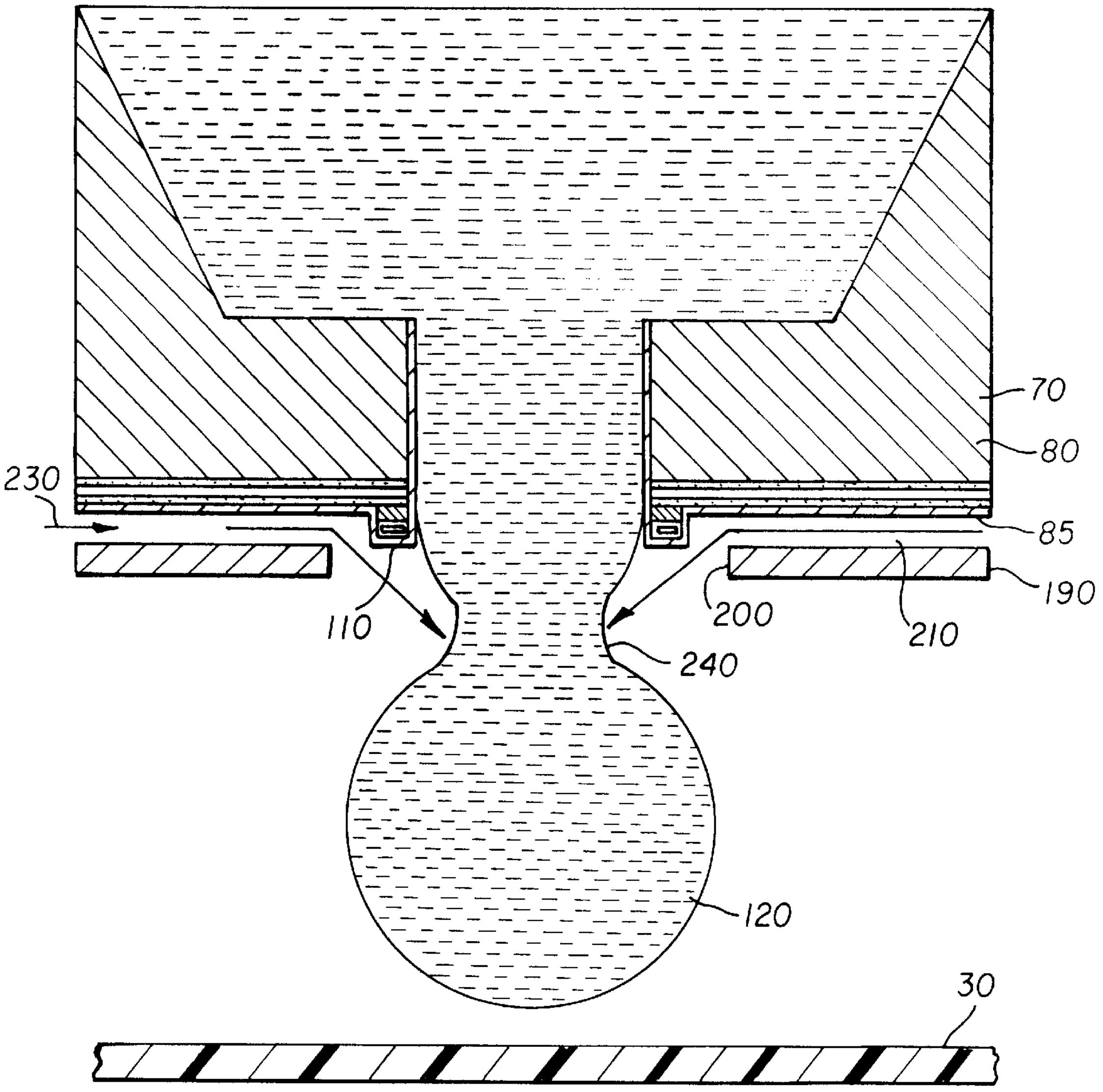
FIG. 5 is a view in vertical section of the nozzle connected to the print head, this view showing the ink meniscus being formed into the extended ink meniscus, the extended ink meniscus shown extending further from the nozzle.
Figure 6:
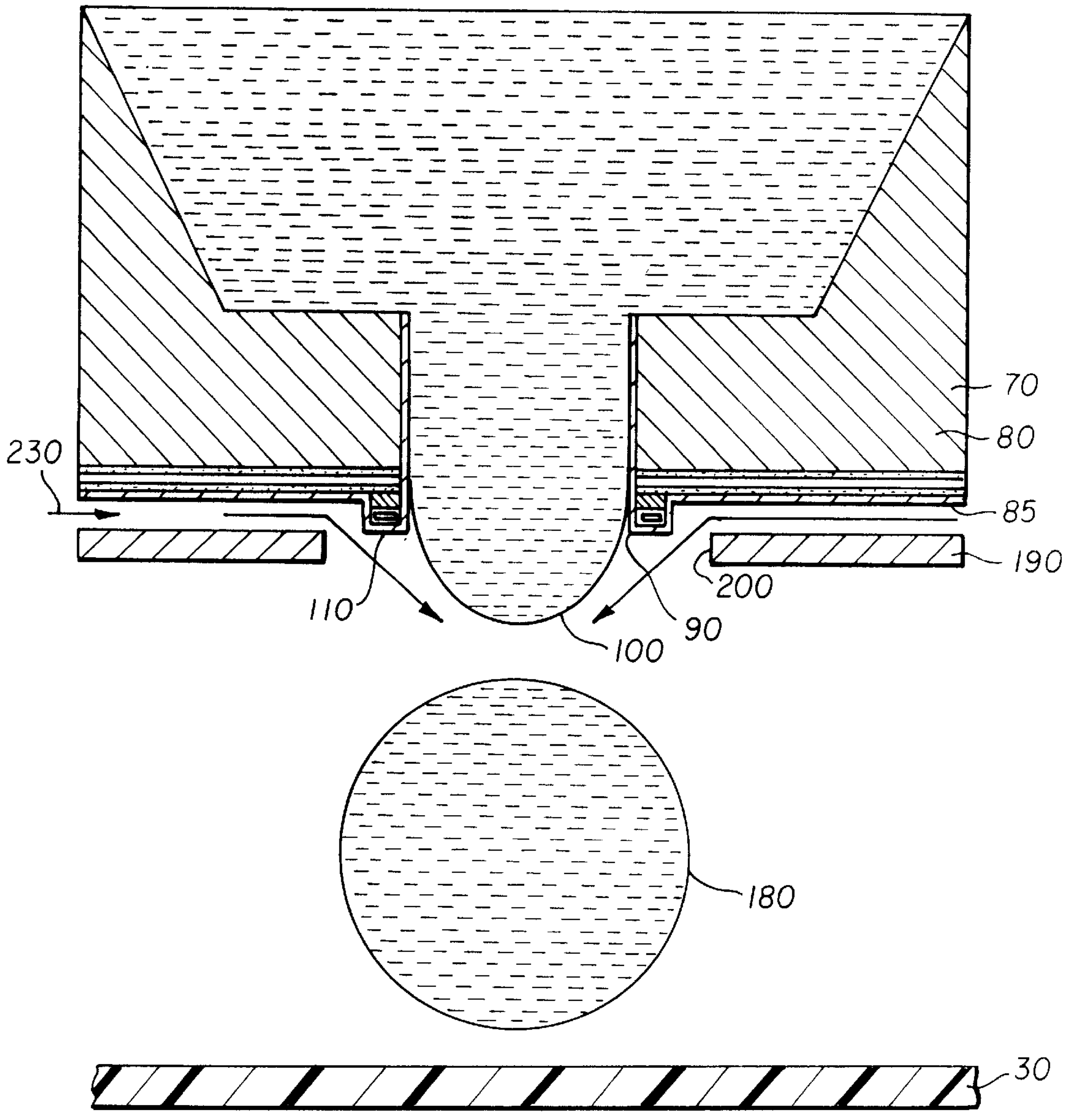
FIG. 6 is a view in vertical section of the nozzle connected to the print head, this view showing an ink droplet separated from the nozzle by means of a mechanically-assisted cutter.

As best seen in FIGS. 4, 5 and 6, as heater element 110 heats ink meniscus 100 to relax the surface tension thereof, extended ink meniscus 120 forms. As extended ink meniscus 120 forms, a neck portion 240 of reduced diameter also forms. Formation of neck portion 240 is assisted by flow of the pressurized gas through passage 210 which directs the gas flow against extended ink meniscus 120. The force of the gas acting against neck portion 240 causes neck portion to sever, thereby forming ink droplet 180 which is now separated from ink meniscus 100. Ink droplet 180 is propelled outwardly from orifice 90 by the previously mentioned static back pressure acting on extended ink meniscus 120, so that droplet 180 is intercepted by receiver medium 30 to form an ink spot thereon. A plurality of these ink spots from variously selected nozzles 80 form printed image 20 on receiver medium 30. It may be appreciated that as the gas travels through circular opening 200, the gas exerts a separation force annularly around neck portion 240 for efficiently severing neck portion 240. In addition, it is believed that this force of gas pressure causes any particulate matter 245 (e.g., dirt, dust and the like) to be cleared away from orifice 90, so that orifice 90 is blockage-free. Such blockage of orifice 90 is undesirable because blockage of one or more orifices 90 gives rise to undesirable image artifacts, such as banding and streaking. By way of example only, and not by way of limitation, the gas traveling along passage 210 may have a velocity between approximately 40 m/sec and approximately 80 m/sec. Preferably the gas has a velocity of approximately 60 m/sec within this range. The force of the gas propels ink droplet 180 towards receiver medium 30 at a velocity of between approximately 5 m/sec and approximately 10 m/sec. Preferably, ink droplet 180 is propelled at a velocity of approximately 10 m/sec. However, it may be appreciated that it is important to supply a chemical humectant to ink menisci 100. This is important because the presence of humectant in the gas prevents crusting and drying of the ink.

Therefore, returning to FIG. 1, a humectant supply unit, generally referred to as 250, is provided for preventing the previously mentioned crusting and drying of the ink. Humectant supply unit 250 may comprise a suitably regulated reservoir 260 preferably connected to third conduit 225, such as by means of a fourth conduit 270. Reservoir 260 supplies the chemical humectant to the gas, which in turn supplies the humectant to the ink as the gas flows through opening 200 and thereafter flows over ink menisci 100. By way of example only, and not by way of limitation, the humectant may be diethylene glycol, glycerin, or the like. More specifically, diethylene glycol or glycerine at a concentration between approximately 0.1% to 20% by volume may be mixed in the gas stream, if desired.

Figure 7:
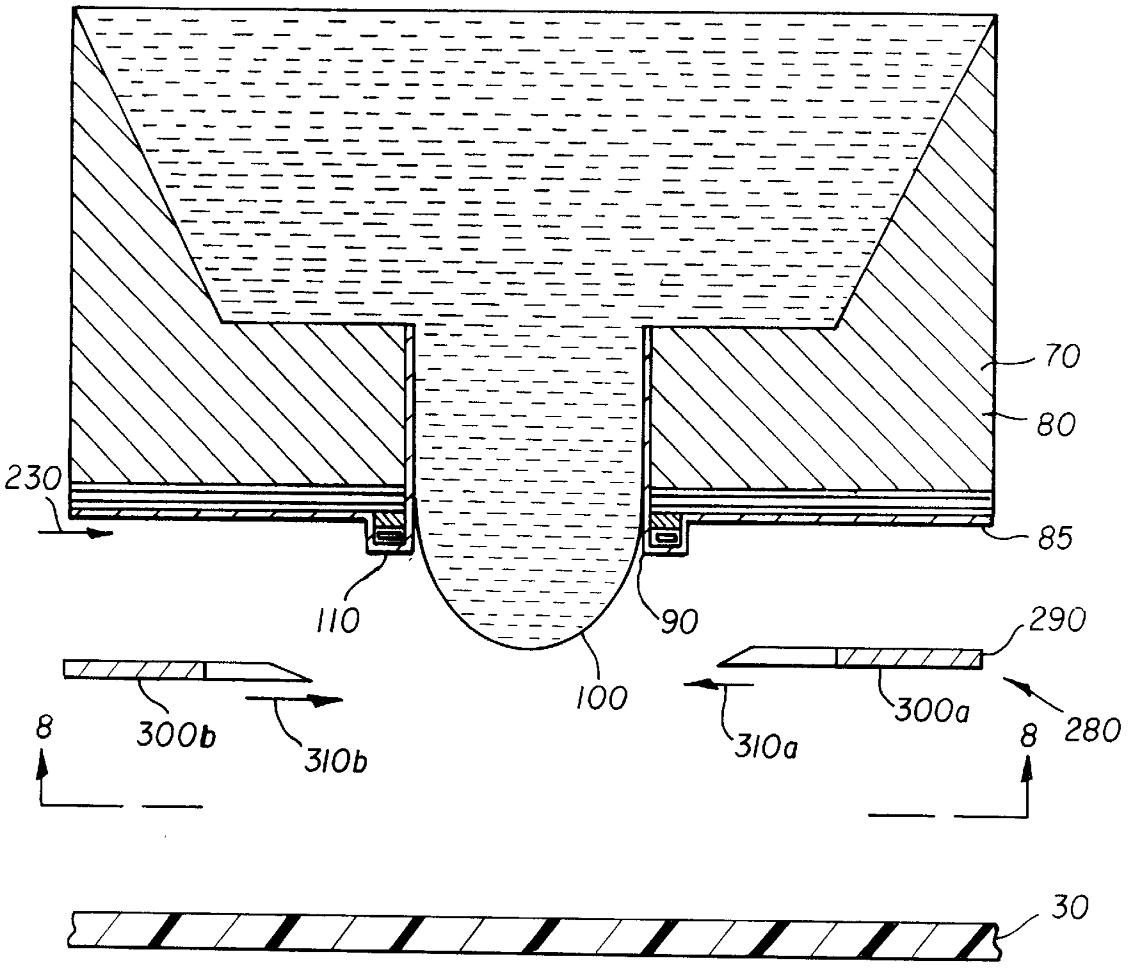
FIG. 7 is a view in vertical section of the nozzle connected to the print head, this view showing an alternative embodiment of the mechanically-assisted cutter.
Figure 8:
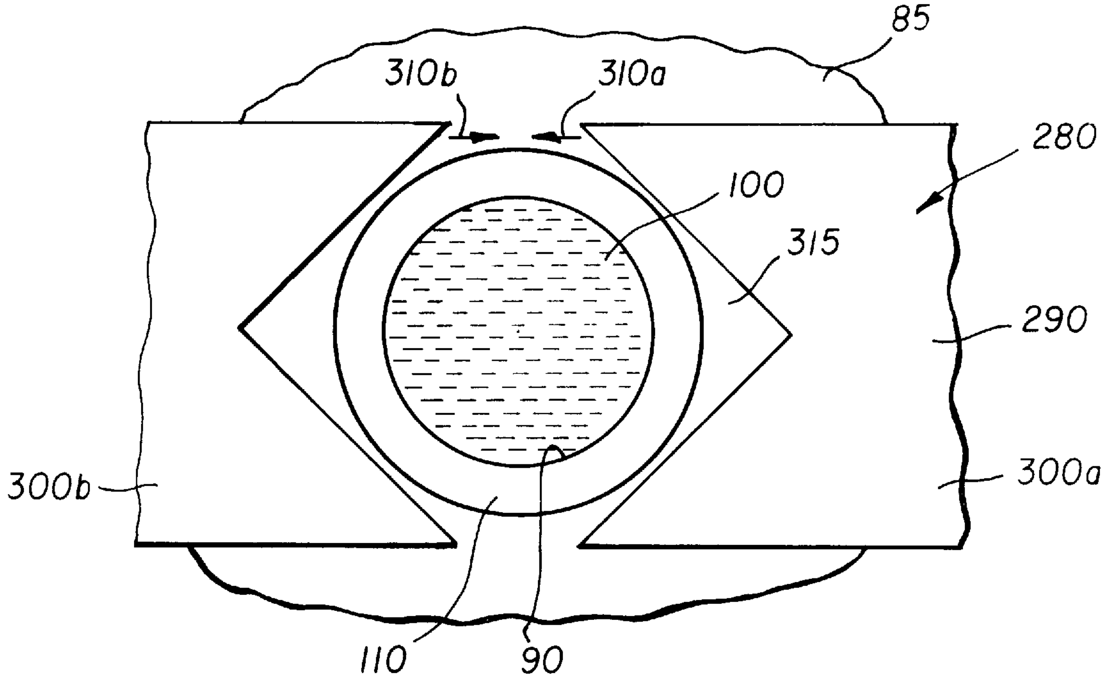
FIG. 8 is a plan view of the nozzle taken along section line 8—8 of FIG. 7.

Turning now to FIGS. 7 and 8, there is shown a second embodiment of the invention, wherein the cutter includes a blade, generally referred to as 280, for separating extended ink meniscus 120 from orifice 90. Blade 280 may be in the form of a closable shutter 290, shown in FIGS. 7 and 8 in an open first position. More specifically, shutter 290 comprises a pair of guillotine members **300*a* and 300*b* disposed adjacent orifice 90. When shutter 290 is in the open first position, guillotine members 300*a* and 300*b* define a shutter aperture 315 aligned with orifice 90 and substantially surrounding orifice 90. Guillotine members 300*a* and 300*b* are movable from the open first position to a second closed position (not shown) in a direction illustrated by arrows 310*a* and 310*b*, such that shutter aperture 315 is closed thereby. Guillotine members 300*a* and 300*b* cover orifice 90 when actuated so as to close shutter aperture 315. Closing and opening of shutter 290 is controlled by means of microcontroller 150. It will be understood with reference to FIG. 7 that guillotine member 300*a* does not lay in the same plane as guillotine member 300*b*; rather, guillotine member 300*a* is disposed in a second plane spaced-apart from guillotine member 300*b* by a predetermined distance such that guillotine members 300*a* and 300*b* slide across each other as guillotine members 300*a* and 300*b* translate in the direction of arrows 310*a* and 310*b*. In this manner, guillotine members 300*a* and 300*b* do not interfere with each other when translated. Of course, guillotine members 300*a* and 300*b* are reciprocatable for severing each extended ink droplet 120 produced. Moreover, guillotine members 300*a* and 300*b* are preferably coated with a layer of TEFLON (polytetrafluoroethylene) or the like in order to render the exterior surfaces of guillotine members 300*a* and 300*b* hydrophobic. The mark "TEFLON" is a registered trademark of the E.I. du Pont de Nemous Company, located in Wilmington, Del. Rendering the exterior surfaces of guillotine members 300*a* and 300*b* decreases risk that the severed droplets will adhere to the exterior surfaces of guillotine members 300*a* and 300*b*. Hydrophobizing the exterior surfaces increases the likelihood that release of the severed ink droplets from the vicinity of nozzles 80 will not be retarded by adherence to the exterior surfaces of members 300*a* and 300*b*.**

It will be understood from the teachings herein that an advantage of the present invention is that use thereof separates an ink meniscus from an ink nozzle orifice while clearing-away particulate matter from about the orifice, so that the orifice is blockage-free. This is so because the gas jet flows across the orifice with sufficient force as the extended ink meniscus is separated from the orifice. In this manner, particulate matter is swept away from the orifice or at least prevented from settling onto the nozzle area.

The invention has been described in detail with particular reference to certain preferred embodiments thereof, but it will be understood that variations and modifications can be effected within the spirit and scope of the invention. For example, the humectant may be added to the ink by means of the ink reservoir rather than being added to the gas by means of the gas reservoir. As another example, the gas stream may supply other beneficial chemicals, if desired, such as nozzle cleaning agents.

As is evident from the foregoing description, certain other aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

Therefore, what is provided is a printer having mechanically-assisted ink droplet separation and method of using same, for separating an ink meniscus from an ink nozzle orifice while clearing-away particulate matter from about the orifice.

PARTS LIST

| | |
|---|---|
| 10 | printer |
| 20 | printed image |
| 30 | receiver medium |
| 40 | input image source |
| 50 | image processor |
| 60 | heater control circuit |
| 70 | print head |
| 80 | nozzle |
| 85 | outside surface |
| 90 | orifice |
| 100 | ink meniscus |
| 110 | heater elements |
| 115 | power supply |
| 120 | extended ink meniscus |
| 130 | transport system |
| 140 | transport control system |
| 150 | microcontroller |
| 160 | ink pressure regulator |
| 165 | first conduit |
| 170 | ink reservoir |
| 175 | second conduit |
| 180 | ink droplet |
| 190 | plate member |
| 200 | opening |
| 210 | passage |
| 220 | gas pressure regulator |
| 225 | third conduit |
| 230 | arrow |
| 240 | neck portion |
| 245 | particulate matter |
| 250 | humectant supply unit |
| 260 | reservoir |
| 270 | fourth conduit |
| 280 | blade |
| 290 | shutter |
| 300a/b | guillotine members |
| 310a/b | arrow |
| 315 | shutter aperture |

What is claimed is:

1. A printer, comprising:

(a) a print head;

(b) a nozzle connected to said print head, said nozzle having a liquid meniscus extending therefrom; and (c) a mechanically-assisted cutter disposed exteriorly to said nozzle for separating the meniscus from said nozzle.

2. The printer of claim 1, wherein said cutter is adapted to direct a gas jet against the meniscus for separating the meniscus from said nozzle.

3. The printer of claim 1, wherein said cutter comprises a blade engageable with the meniscus for separating the meniscus from said nozzle.

4. A printer having mechanically-assisted ink droplet separation, comprising:

(a) a print head;

(b) a nozzle connected to said print head, said nozzle having an ink meniscus therein;

(c) a heater connected to said nozzle for heating said nozzle, so that the ink meniscus heats as said nozzle heats and so that the ink meniscus extends from said nozzle to define an extended ink meniscus as the ink meniscus heats; and (d) a mechanically-assisted cutter disposed exteriorly to said nozzle for separating the extended ink meniscus from said nozzle, so that an ink droplet forms as the extended ink meniscus separates from said nozzle.

5. The printer of claim 4, wherein said cutter is adapted to direct a pressurized gas jet against the extended ink meniscus for separating the extended ink meniscus from said nozzle.

6. The printer of claim 4, wherein said cutter is adapted to direct a pressurized gas jet against the extended ink meniscus for separating the extended ink meniscus from said nozzle and for propelling the ink droplet formed therein at a velocity of between approximately 5 m/sec and approximately 10 m/sec.

7. The printer of claim 4, wherein said cutter is adapted to direct a pressurized gas jet against the extended ink meniscus, the gas jet having a velocity of between approximately 40 m/sec and approximately 80 m/sec for separating the extended ink meniscus from said nozzle.

8. The printer of claim 4, wherein said cutter is adapted to direct a pressurized gas jet against the ink meniscus, the gas jet having an humectant therein to retard drying of the ink meniscus.

9. The printer of claim 4, wherein said cutter is adapted to direct a gas jet against the ink meniscus, the gas jet having an humectant therein having diethylene glycol to retard drying of the ink meniscus.

10. The printer of claim 4, wherein said cutter is adapted to direct a gas jet against the ink meniscus, the gas jet having an humectant therein having glycerin to retard drying of the ink meniscus.

11. The printer of claim 4, wherein said cutter comprises a blade engageable with the extended ink meniscus for separating the extended ink meniscus from said nozzle.

12. The printer of claim 11, wherein said blade comprises a closable shutter disposed adjacent to said nozzle for separating the extended ink meniscus from said nozzle as said shutter closes.

13. A printer having mechanically-assisted ink droplet separation for printing an image on a receiver medium, comprising:

(a) a print head capable of being disposed opposite the receiver medium;

(b) a plurality of nozzles integrally connected to said print head, each of said nozzles having a generally circular orifice facing the receiver medium and an ink meniscus of predetermined surface tension disposed in the orifice;

(c) a plurality of generally annular heater elements surrounding respective ones of the orifices and in heat transfer communication with the ink meniscus in each orifice for heating the ink meniscus, so that the predetermined surface tension relaxes as the ink meniscus heats and so that the ink meniscus extends from the orifice to define an extended ink meniscus as the predetermined surface tension relaxes; and (d) a plurality of mechanically-assisted cutters disposed exteriorly to respective ones of said nozzles for separating the extended ink meniscus from each orifice while clearing-away particulate matter from about the orifice, so that an ink droplet forms as the ink meniscus is separated.

14. The printer of claim 13, wherein each of said cutters defines a passage therein for directing a pressurized air jet against the extended ink meniscus, the air jet having a velocity of approximately 60 m/sec for separating the extended ink meniscus from the orifice and for propelling the ink droplet formed thereby towards the receiver medium at a velocity of approximately 6 m/sec.

15. The printer of claim 13, wherein each of said cutters defines a passage therein for directing a pressurized air jet against the extended ink meniscus for separating the ink meniscus from the orifice, the air jet having a diethylene glycol humectant therein to retard drying of the ink meniscus, so that the orifice is blockage-free.

16. The printer of claim 13, wherein each of said cutters defines a passage therein for directing a pressurized air jet against the extended ink meniscus for separating the ink meniscus from the orifice, the air jet having a glycerin humectant therein to retard drying of the ink meniscus, so that the orifice is blockage-free.

17. The printer of claim 13, wherein each of said cutters comprises a closable shutter surrounding each orifice for separating the extended ink meniscus from the orifice as said shutter closes.

18. A method of using a printer, comprising the steps of:

(a) extending a liquid meniscus from a nozzle connected to a print head; and (b) separating the meniscus from the nozzle by actuating a mechanically-assisted cutter disposed exteriorly to the nozzle.

19. The method of claim 18, wherein the step of separating the meniscus comprises the step of separating the meniscus by directing a gas jet against the meniscus.

20. The method of claim 18, wherein the step of separating the meniscus comprises the step of separating the meniscus by engaging the meniscus with a blade.

21. A method of using a printer having mechanically-assisted ink droplet separation, comprising the steps of:

(a) disposing an ink meniscus in a nozzle connected to a print head;

(b) extending the ink meniscus form the nozzle to define an extended ink meniscus by heating the nozzle with a heater connected to the nozzle, so that the ink meniscus heats as the nozzle heats; and (c) separating the extended ink meniscus from the nozzle by actuating a mechanically-assisted cutter disposed exteriorly to the nozzle, so that an ink droplet forms as the extended ink meniscus separates from the nozzle.

22. The method of claim 21, wherein the step of separating the extended ink meniscus comprises the step of directing a pressurized gas jet against the extended ink meniscus.

23. The method of claim 21, wherein the step of separating the extended ink meniscus comprises the step of directing a pressurized gas jet against the extended ink meniscus and propelling the ink droplet formed thereby at a velocity of between approximately 5 m/sec and approximately 10 m/sec.

24. The method of claim 21, wherein the step of separating the extended meniscus comprises the step of directing a pressurized gas jet against the extended ink meniscus, the gas jet having a velocity of between approximately 80 m/sec and approximately 40 m/sec.

25. The method of claim 21, further comprising the step of retarding drying of the ink meniscus by directing a pressurized gas jet against the ink meniscus, the gas jet having an humectant therein.

26. The method of claim 21, further comprising the step of retarding drying of the ink meniscus by directing a gas jet against the ink meniscus, the gas jet having an humectant therein having diethylene glycol.

27. The method of claim 21, further comprising the step of retarding drying of the ink meniscus by directing a gas jet against the ink meniscus, the gas jet having an humectant therein having glycerin.

28. The method of claim 21, wherein the step of separating the extended ink meniscus comprises the step of engaging a blade with the extended ink meniscus.

29. The method of claim 28, wherein the step of engaging a blade with the extended ink meniscus comprises the step of disposing a closable shutter adjacent to the nozzle, so that the extended ink meniscus separates from the nozzle as the shutter closes.

30. A method of using a printer having mechanically-assisted ink droplet separation for printing an image on a receiver medium, comprising the steps of:

(a) disposing an ink meniscus of predetermined surface tension in each of a plurality of generally circular orifices defined by respective ones of a plurality of nozzles integrally connected to a print head, each orifice facing the receiver medium;

(b) extending the ink meniscus from the orifice to define an extended ink meniscus by heating the ink meniscus with a generally annular heater element surrounding the orifice and in heat transfer communication with the ink meniscus in the orifice, so that the predetermined surface tension relaxes as the ink meniscus heats and so that the ink meniscus extends from the orifice to define the extended ink meniscus as the predetermined surface tension relaxes; and (c) separating the extended ink meniscus from each orifice while clearing-away particulate matter from about the orifice by actuating a plurality of mechanically-assisted cutters disposed exteriorly to respective ones of the nozzles, so that an ink droplet forms as the extended ink meniscus is separated.

31. The method of claim 30, wherein the step of separating the extended ink meniscus comprises the step of directing a pressurized air jet against the extended ink droplet from a passage defined in the cutter, the air jet having a velocity of approximately 60 m/sec.

32. The method of claim 31, wherein the step of directing a pressurized air jet against the extended ink meniscus comprises the step of propelling the ink droplet formed thereby towards the receiver medium at a velocity of approximately 6 m/sec.

33. The method of claim 31, further comprising the step of retarding drying of the ink meniscus by directing a pressurized air jet against the ink meniscus from a passage defined in the cutter, the air jet having a diethylene glycol humectant, so that the orifice is blockage-free.

34. The method of claim 31, further comprising the step of retarding drying of the ink meniscus by directing a pressurized air jet against the ink miniscus from a passage defined in the cutter, the air jet having a glycerin humectant therein, so that the orifice is blockage-free.

35. The method of claim 31, wherein the step of separating the ink meniscus comprises the step of disposing a closable shutter adjacent to the nozzle, so that the extended ink meniscus separates from the orifice as the shutter closes.

* * * * *